United States Patent
Rippelmeyer et al.

(10) Patent No.: US 6,245,131 B1
(45) Date of Patent: Jun. 12, 2001

(54) ELECTROSTATIC AIR CLEANER

(75) Inventors: Dennis M. Rippelmeyer, Waterloo, IL (US); Jerry W. McElroy, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/165,697

(22) Filed: Oct. 2, 1998

(51) Int. Cl.[7] .................................................. B03C 3/36
(52) U.S. Cl. ............................. 96/18; 95/2; 95/4; 95/78; 96/19; 96/56; 96/60; 96/80
(58) Field of Search .................... 96/18, 56, 19, 96/60, 62, 63, 80; 95/2, 23, 4, 78

(56) References Cited

U.S. PATENT DOCUMENTS

| | | | |
|---|---|---|---|
| 2,932,966 | * 4/1960 | Grindell | 96/56 X |
| 3,989,486 | 11/1976 | Baysinger | 55/DIG. 34 |
| 4,290,788 | 9/1981 | Pittman et al. | 55/481 X |
| 4,376,637 | * 3/1983 | Yang | 96/18 X |
| 4,562,522 | 12/1985 | Adams et al. | 261/235 X |
| 4,654,772 | 3/1987 | Thorne | 363/19 |
| 5,071,455 | 12/1991 | Abedi-Asi | 55/509 X |
| 5,124,905 | 6/1992 | Kniepkamp | 323/903 X |
| 5,454,859 | * 10/1995 | Chiba et al. | 96/18 |
| 5,688,308 | * 11/1997 | Voigts | 96/18 |

FOREIGN PATENT DOCUMENTS

| | | | |
|---|---|---|---|
| 52-50969 | * 4/1977 | (JP) | 95/23 |
| 54-2266 | * 1/1979 | (JP) | 95/23 |

OTHER PUBLICATIONS

White–Rodgers Division Emerson Electric Co. Electro–Air, The Electro–Air Electronic Air Cleaner Compartment (brochure), Undated.
White–Rodgers Division Emerson Electric Co. Mountain–Air, Electronic Air Cleaner (brochure), 1978.

* cited by examiner

*Primary Examiner*—Richard L. Chiesa
(74) *Attorney, Agent, or Firm*—Harness, Dickey & Pierce (57) ABSTRACT

An electrostatic air cleaner for installation in an air-circulating system, including a flow sensor for sensing the flow of air across the electrostatic air cleaner, and a switch, responsive to the flow sensor, for operating the electrostatic air cleaner only when the flow of air exceeds a predetermined threshold. More particularly, the electrostatic air cleaner includes an electrostatic air cleaner cover unit adapted to be secured over the opening in a frame in the air circulating system which frame contains at least one removable electrostatic air cleaning cell. The cover unit has a baffle for substantially blocking the air flow between the electrostatic air cleaning cell and the cover unit. The baffle has an opening therein, and a bypass tube is aligned with the opening in the baffle. An air flow sensor is disposed in the tube for sensing the air flow through the tube. The air flow sensor preferably includes a self-heating thermistor for sensing the flow in the bypass tube. A second thermistor can be provided to sense the ambient temperature, for calibrating the flow sensing and providing high temperature and low temperature cut-offs.

12 Claims, 9 Drawing Sheets

ELECTROSTATIC AIR CLEANER

FIELD OF THE INVENTION

This invention relates to electrostatic air cleaners.

BACKGROUND OF THE INVENTION

Electrostatic air cleaners are widely used in air circulating systems, such as heating, ventilating, and air conditioning systems, to remove dust and other contaminants from the air circulating through the system. Electrostatic air cleaners employ a highly charged grid that applies an electrical charge to the dust and contaminants passing through it, and oppositely charged collectors to attract the charged dust and contaminant particles. While these systems are very beneficial and effective, they can be difficult to install, and more particularly difficult to retrofit in existing air circulating systems. This difficulty is at least in part due to the fact that if the electrostatic air cleaner operates when the air is not circulating in the air circulating system, the electrostatic air cleaner generates ozone. Thus the electrostatic air cleaner must generally be wired into air circulating system to prevent this undesirable result, and thus installation of electrostatic air cleaners is complicated and time-consuming, and often requires professionals. Previous attempts have been made to provide an electrostatic air cleaner that can sense air flow, see, for example Baysinger, U.S. Pat. No. 3,989,486, incorporated herein by reference. However, these systems generally relied upon diaphragm operated electromechanical or electronic switches or thermistors for measuring pressure differentials between the air circulating system and the ambient environment.

In modern high efficiency sealed systems, the pressure differential between the system and the ambient is unknown, and thus is it difficult to implement such a system. In installations in garages and attics natural convective currents may "fool" these prior systems into activating the electronic air cleaning system, even though the system blower is off.

One attempt to overcome these difficulties is the use of a sail switch, which detects air flow within the system, but these switches are typically very large and thus cannot be incorporated into a self-contained electrostatic air cleaning system, and must be mounted remotely.

Moreover, it is difficult to mount conventional electrostatic air cleaners in the small enclosures provided in some new construction. Some electrostatic cleaners have cover mounts that require clearance around the covers which prevent mounting the cleaners in tight spaces. Other electrostatic air cleaners have covers with components that protrude beyond the profile of the frame opening, also preventing the cleaner from being mounted in tight spaces. This problem was exacerbated by the fact that in conventional electrostatic air cleaners, the cover could typically only be mounted in one orientation, limiting how the electrostatic air cleaner could be incorporated into the air circulating system.

SUMMARY OF THE INVENTION

The present invention relates to an improved electrostatic air cleaner which is of simple construction, and which does not need to be wired into the air circulating system, so it is easy to install, even in retrofit situations. Generally, the electrostatic air cleaner comprises a flow sensor for sensing the pressure differential across the electrostatic air cleaner by sensing the flow of air through a bypass tube. The electrostatic air cleaner also includes a switch, responsive to the flow sensor, for operating the electrostatic air cleaner only when the flow of air exceeds a predetermined threshold, corresponding to a desired pressure differential across the electrostatic air cleaner. Thus the electrostatic air cleaner operates only when air is flowing in the air circulating system, yet it does not have to be wired into the fan control of the air circulating system.

In the preferred embodiment, an electrostatic air cleaner cover unit is adapted to be secured over the opening in a frame in an air circulating system for mounting a removable air filter, and at least one removable electrostatic air cleaning cell. The cover unit has a baffle for substantially blocking the air flow between the air filter and the cover unit. The baffle has an opening therein, and a tube aligned with the opening in the baffle. An air flow sensor is disposed in the tube for sensing the air flow through the tube. A switch, responsive to the air flow sensor, conducts power to the at least one electrostatic air cleaning cell when the sensed air flow exceeds a predetermined threshold, thus insuring that the electrostatic air cleaner is operated only when there is air flowing in the air circulating system, and more preferably when the air flow corresponds to the air circulating system blower being on.

The cover unit has first and second sides, and preferably has two baffles, one baffle positioned to engage the filter when the first side of the cover unit is oriented upstream, and the other baffle positioned to engage the filter when the second side of the cover unit is oriented upstream. Each baffle has an opening therein, and the tube is aligned with the opening in each baffle, so that regardless of which way the cover unit is installed over the opening, the air flow between the filter and the cover unit is directed through the tube, and sensed by the air flow sensor.

The cover unit has its own conventional power connection, and a contact disk for providing electric power to the at least one electrostatic cell. Thus, no special power connections need to be made to electrostatic air cleaner, further facilitating installation. The cover unit is designed so that it does not have an "up" side or a "down" side, so that it can be placed over the opening the cabinet in any convenient orientation. The cover is sized to the profile of the opening in the frame, and is designed to pull straight back from the cabinet, reducing the amount of clearance required, and thus allowing an electrostatic air cleaner to be installed in air circulating systems where they previously would not fit. The ability of the cover to be used in either orientation also makes it less prone to end-user mistakes.

These and other features and advantages will be in part apparent and in part pointed out hereinafter.

BRIEF DESCRIPTION OF THE DRAWINGS

Corresponding reference numerals indicate corresponding parts dutough the several views of the drawings.

DETAILED DESCRIPTION OF THE INVENTION

Figures 4, 5:
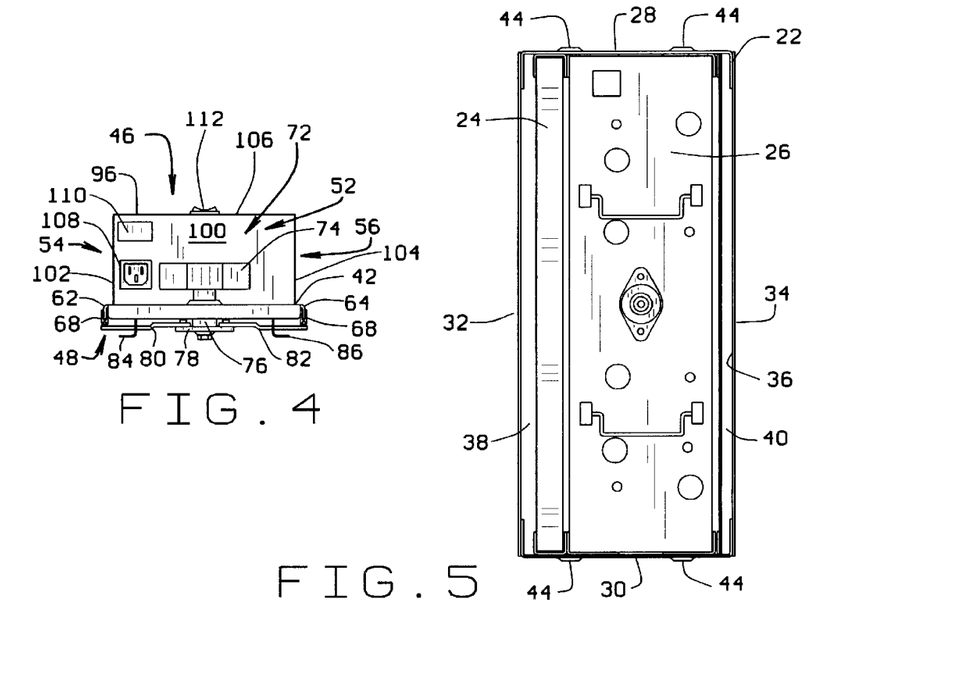
FIG. 4 is a bottom plan view of the cover unit.
FIG. 5 is a front elevation view of the frame with the air filter and electrostatic cells mounted therein.
Figure 6:
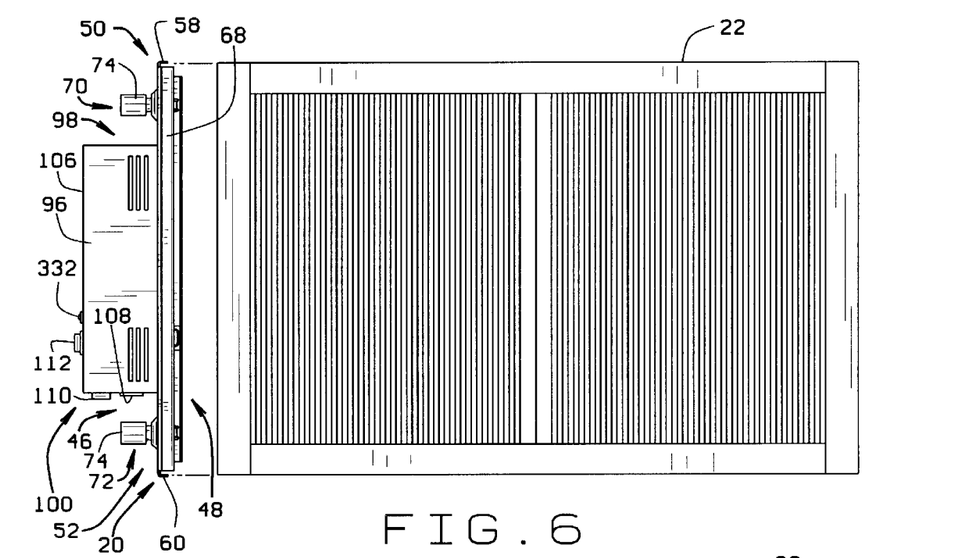
FIG. 6 is a side elevation view of the frame with the air filter and electrostatic cells mounted therein, and of the cover shown before the cover is mounted over the opening in the frame.
Figure 7:
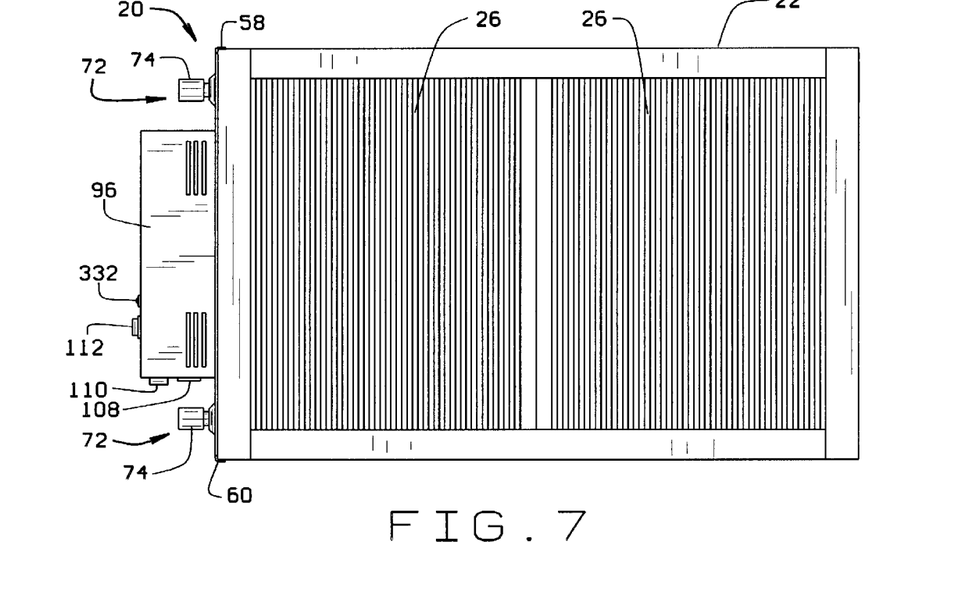
FIG. 7 is a side elevation view of the frame with the air filter and electrostatic cells mounted therein, showing the cover after it is mounted over the opening in the frame.

An electrostatic air cleaner constructed according to the principles of this invention is indicated generally as 20 in FIGS. 6 and 7. The electrostatic air cleaner comprises a cabinet 22 adapted for removably mounting an air filter 24 (FIG. 5) and at least one, and in the preferred embodiment two, electrostatic cells 26. The use of two cells 26 allows the individual cells to be smaller, so that the electrostatic air cleaner can be installed in a small space yet the cells can still be easily removed for periodic cleaning and/or replacement. The cabinet 22 is adapted to be mounted in an air circulating system, such as the HVAC system in a home. As shown in FIG. 5, the front of the cabinet 22 has a first end 28, a second end 30, and first and second sides 32 and 34. The cabinet 22 has a generally rectangular opening 36 at the front of the cabinet, so that the air filter 24 and the electrostatic cells 26 can be removed for cleaning or replacement. The cabinet 22 has channels 38 and 40 adjacent sides 32 and 34. A cover unit 42 is adapted to be mounted over the opening 36 in the cabinet 22. There are raised lands 44 on the first and second ends 28 and 30 of the cabinet 22 for spacing the cabinet from its support surface to enable the cover to be installed and removed from the opening 36 of the cabinet.

Figure 1:
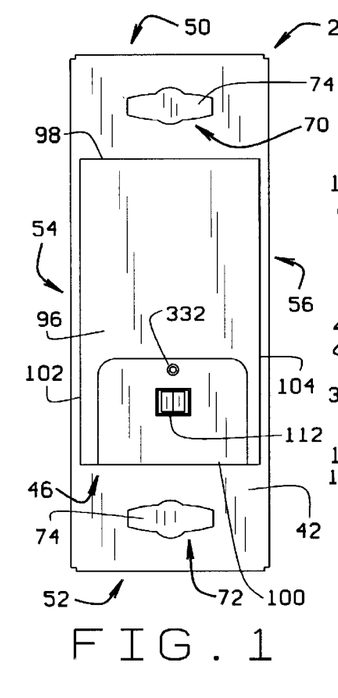
FIG. 1 is a front elevation view of the an electrostatic air cleaning system constructed according to the principles of this invention.
Figures 2, 3:
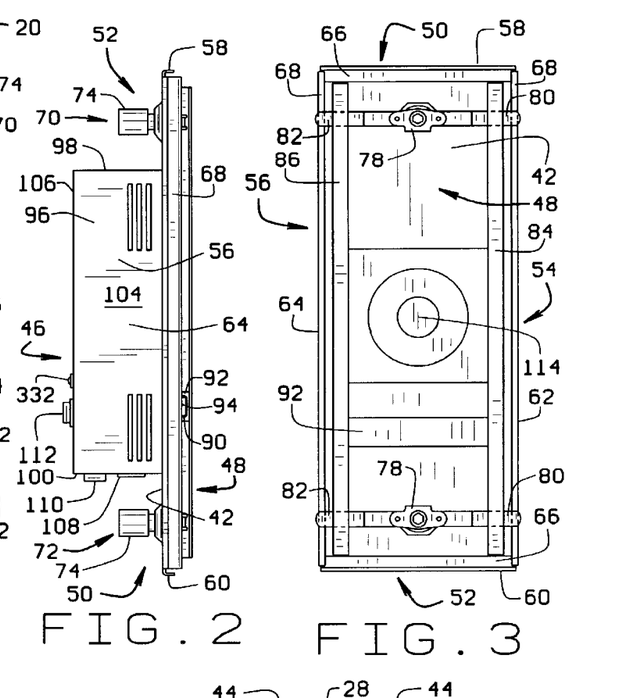
FIG. 2 is a side elevation view of the cover unit.
FIG. 3 is a rear elevation view of the cover unit.

The cover unit 42 has a front 46 (FIG. 1), a rear 48 (FIG. 3), a first end 50, a second end 52 (FIG. 4), and a first side first 54 and a second side 56. The rear 48 of the cover has a lip 58 projecting from the first end 50, a lip 60 projecting from the second end 52, and lips 62 and 64 projecting from the first and second sides 54 and 56, respectively. The lips 58 and 60 on the first and second ends are adapted to overlap the ends of the cabinet 22. The lands 44 ensure that there is sufficient clearance between the cabinet and whatever surface abuts the cabinet for the lips 58 and 60. As described more clearly below, the cover 42 is constructed to be mounted over the opening 36 in either orientation, i.e., with the first end of the cover aligned with the first end of the cabinet 22, or the first end of the cover opposite from the first end of the cabinet. There are strip gaskets 66 on the rear 48 of the cover 42 for engaging and sealing with the ends 28 and 30 of the cabinet 22.

There is a gasket 68 on the lips 62 and 64 on the first and second sides 54 and 56 of the cover unit 42. The gaskets 68 and their corresponding lips are adapted to fit in one of the channels 38 and 40 on the first and second sides 32 and 34 of the cabinet 22. However, as described more clearly below, the cover 42 is constructed to be mounted over the opening 36 in either orientation, i.e., with the lips 62 and 64 in the channels 38 and 40, respectively, or with the lips 62 and 64 in the channels 40 and 38, respectively.

Figure 8:
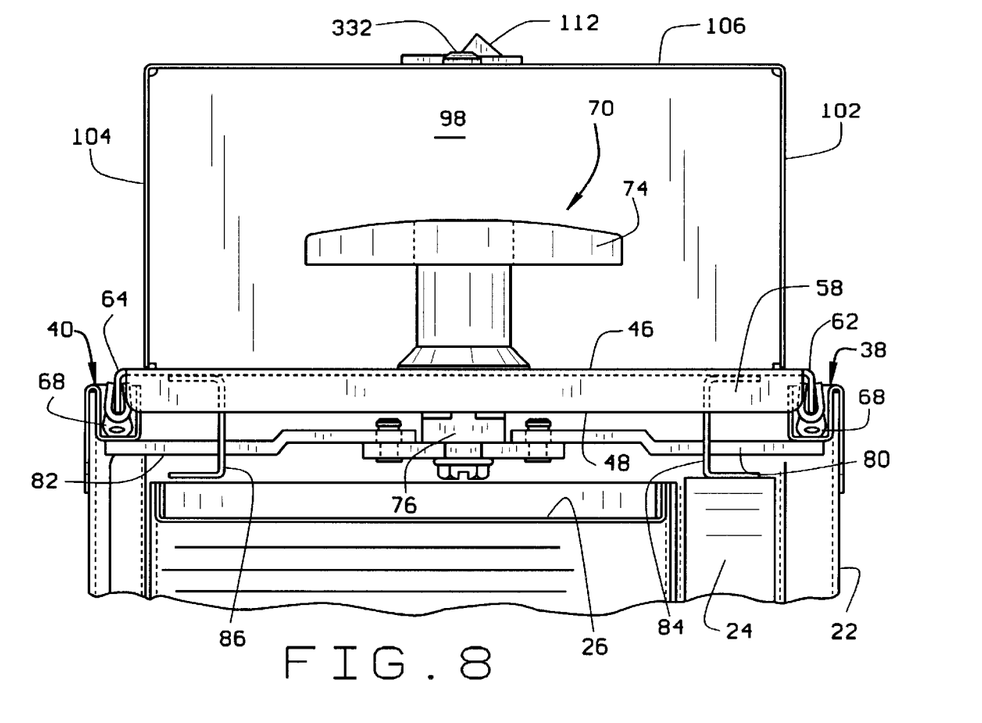
FIG. 8 is an enlarged partial cross-sectional view of the electrostatic air cleaner taken along the plane of line 8—8 in FIG. 7.

There are two latches 70 and 72 adjacent the first and second ends 50 and 52, respectively, of the cover unit. Each of the latches 70 and 72 comprises a handle 74 that turns a shaft 76, which in turn turns a link member 78. The ends of two arms 80 and 82 are pivotally mounted to the link member 78. The free ends of the arms 80 and 82 extend through slots in the baffles, described below. Rotation of the handle 74 in one direction causes the ends of the arms 80 and 82 to extend laterally outwardly and rotation of the handle in the other direction causes the ends of the arms to retract laterally inwardly. When the cover 42 is properly positioned over the opening 36 in the cabinet 22, the arms 80 and 82 extend behind the channels 38 and 40 (see FIG. 8), securing the cover in the opening.

A first baffle 84 is mounted on the rear 48 of the cover unit 42, extending longitudinally from substantially the first end 50 to the second end 52, adjacent the first side 54. A second baffle 86 is mounted on the rear 48 of the cover unit 42, extending longitudinally from the first end 50 to the second end 52, adjacent the second side 56. The first baffle 84 is positioned so that when the first end 50 of the cover 42 is oriented toward the first end 28 of the cabinet 22, the first baffle engages the filter 24 (FIG. 8), substantially blocking air flow in the space between the air filter and the cover unit. The second baffle 86 is positioned so that when the first end 50 of the cover 42 is oriented toward the second end 30 of the cabinet 22, the second baffle engages the filter 24, substantially blocking air flow in the space between the air filter and the cover unit. The baffles 84 and 86 have aligned openings 88 and 90, respectively. A tube 92 extends between the aligned openings 88 and 90. At least part of a flow sensor 94 is positioned in the tube 92.

There is a generally rectangular housing 96 on the front 46 of the cover unit 42. The housing has a first end 98, a second end 100, first and second sides 102 and 104, and front 106. There is a plug receptacle 108 on the second end 100 for connecting to a conventional power cord to provide electric power to the cover unit 42. The receptacle is connected in series through fuse 110 on the second end 100 of the housing 96, and power switch 112 on the front 106 of the housing. The housing contains a transformer 118 that supplies power to the electrostatic cells 26 via a high voltage power supply circuit 116 and to the flow sensor 94. The power supply circuit 116, in response to the flow sensor 94, provides electric power to the disc contact 114 on the rear 46 of the cover unit. The disc contact 114 allows the cover to be mounted in either orientation in the opening 36, and still provide electric power to the cells 26, via the contact buttons 115 on the cells.

When air is flowing through the air circulating system, the flow of air in the space between the air filter 24 and the cover unit 42 is substantially blocked by one of the baffles 84 and 86, although air can flow through the bypass tube 92. As described in more detail below, the flow sensor 94 senses the flow rate through the tube, which is related to the pressure differential across the electrostatic air cleaner. When a sufficient air flow/pressure differential across the electrostatic air cleaner 20 as compared to a predetermined standard is sensed, the power supply circuit 116 provides electric power to the disc contact 114 on the back of the cover unit 42, which provides electric power to the cells 26. A delay may be incorporated into the circuit so that temporary drafts induced in the air circulating system by opening or closing of doors does not falsely indicate that the air circulating system is on and the electrostatic air cleaner should be activated.

Figure 15:
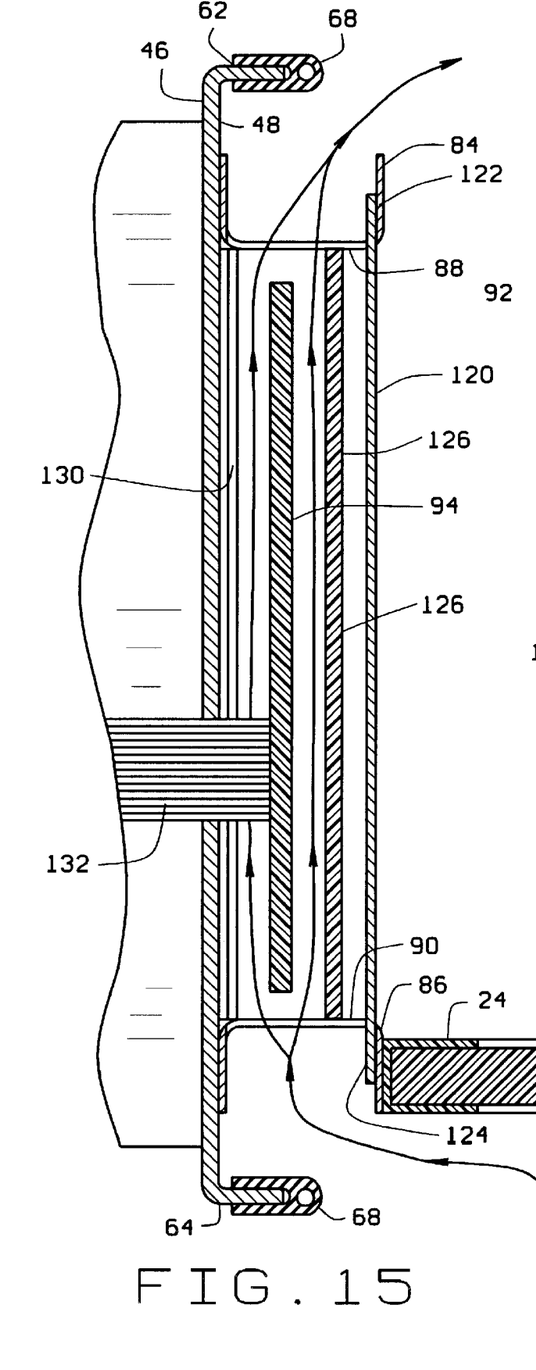
FIG. 15 is a longitudinal cross sectional view of the bypass tube, taken along the plane of line 15—15 in FIG. 3.
Figure 16:
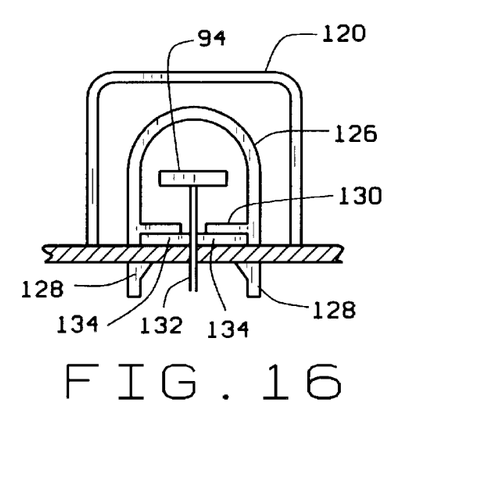
FIG. 16 is a transverse cross sectional view of the bypass tube, taken along the plane of line 16—16 in FIG. 3.

The construction of the bypass tube 92 is shown in detail in FIGS. 15 and 16. As shown in FIGS. 15 and 16, the tube 92 comprises a generally U-shaped channel member 120 extending between the first and second baffles 84 and 86, aligned with openings 88 and 90 therein. Tabs 122 and 124 extend from the ends of the channel member 120 through the openings 88 and 90, and are secured to the baffles 84 and 86, for example by spot welding. Thus the baffles 84 and 86 and the channel member 120 form a generally H-shaped structure on the back 48 of the cover unit 42. Inside the channel member 120 is a conduit 126. The conduit 126 has barbed tabs 128 that extend through slots in the back 48 of the cover unit to mount the conduit on the back of the cover unit. The bottom 130 of the conduit 126 is split to accommodate ribbon wire 132 that provides electrical connection to and supports the air flow sensor 94. The ribbon wire 132 extends through a slot in the back 48 of the cover unit 42, into the generally rectangular housing 96 on the front 46 of the cover unit. Rubber strip gaskets 134 are positioned on each side of the ribbon wire 132, below the split bottom 130 of the conduit 126, between the conduit 126 and the back 48 of the cover unit, to seal the slots in the back 48 of the cover unit 42. The conduit 126 is preferably made of plastic to electrically and thermally insulate the sensor 94. At least one of the baffles 86 or 86 substantially block flow in the space between the filter 24 and electrostatic cells 26 and the cover unit. However, air can flow through the bypass tube 92, and more particularly through the opening 90 in the baffle 86, and through conduit 126, and past the flow sensor 94, and then out of the conduit and through opening 88 in baffle 84. The bypass tube thus provides a parallel flow path to the flow path through the air filter 24 and electrostatic cells 26, and thus the flow through the bypass tube is indicative of the flow through, and the differential pressure across, the air filter and electrostatic cells. Thus the flow sensed by sensor 94 in the bypass tube 92 corresponds to the flow through, and the pressure across the electrostatic cells.

Figure 9:
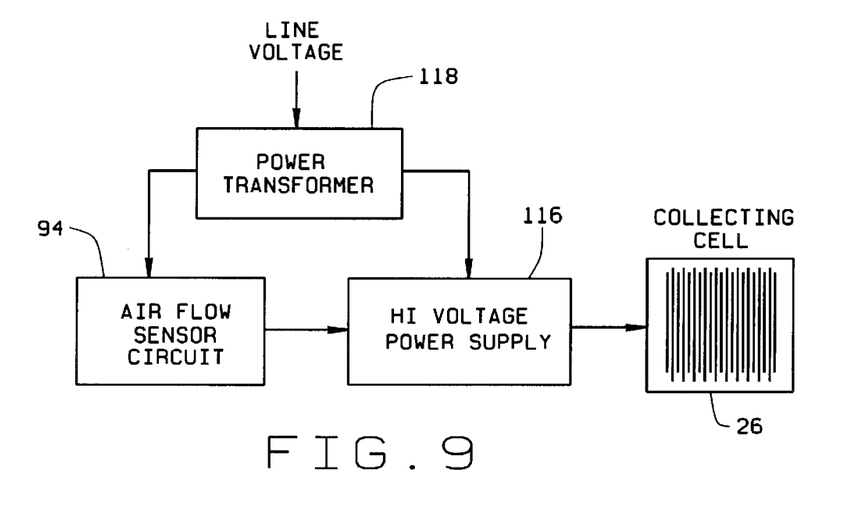
FIG. 9 is a block diagram of the power distribution in the electrostatic air cleaning system.

The power distribution in the air cleaning system is shown schematically in FIG. 9. Line voltage is delivered to power transformer 118 which provides 22 V AC to the air flow sensor circuit 94 and 130 V AC to the high voltage power supply circuit 116. The air flow sensor circuit 94 provides a control signal to the high voltage power supply circuit 116. The high voltage power supply circuit 116 provides power to the cells 26. The air flow sensor circuit 94 and the high voltage power supply circuit 116 are constructed so that in the absence of a signal from flow sensor circuit, the high voltage power supply circuit provides power to the cells 26.

Figure 10:
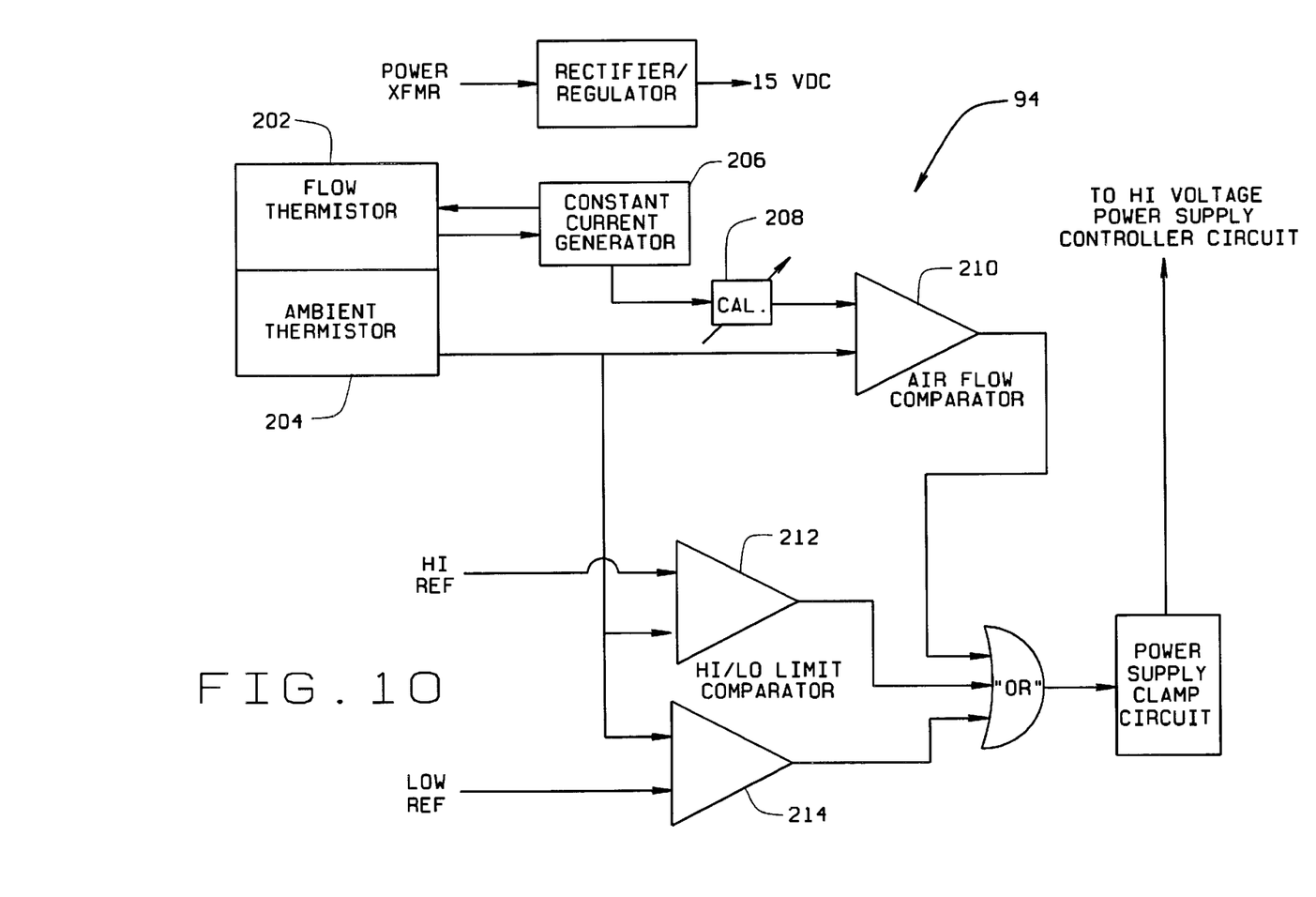
FIG. 10 is a block diagram of the control logic for the flow sensor circuit.

The operation of the air flow sensor circuit 94 is shown schematically in FIG. 10. The circuit 94 comprises a flow sensing thermistor 202 and an ambient temperature sensing thermistor 204. The flow sensing thermistor 202 is connected to a constant current generator 206. The constant current generator 206 is connected through calibrator 208 to an input of air flow comparator 210. The ambient temperature sensing thermistor 204 is also connected to an input of air flow comparator 210. The ambient temperature sensing thermistor 202 is also connected to an input of the high limit comparator 212 and to an input of the low limit comparator 214. A high reference signal is provided to an input of the high limit comparator 212. A low reference signal is provided to an input of the low limit comparator 214.

The air flow comparator 210 determines whether there is air flow across the air flow sensor thermistor 202 by comparing the output of this thermistor with the output of the ambient temperature sensing thermistor 204. If this comparison indicates that there is air flow across the flow sensing thermistor 202 (corresponding to a pressure drop across the air cleaning system) a low signal is provided to OR gate 216. Conversely, if this comparison indicates that there is no air flow across the flow sensing thermistor 202 a high signal is provided to OR gate 216.

The high limit comparator 212 determines whether the ambient temperature exceeds a predetermined limit (set by the high reference signal) by comparing the output of thermistor 204 with the high reference signal. If this comparison indicates that the ambient temperature exceeds the high temperature limit, a high signal is provided to OR gate 216. Conversely, if this comparison indicates that the ambient temperature is below the high temperature limit, a low signal is provided to OR gate 216.

The low limit comparator 214 determines whether the ambient temperature is below a predetermined limit (sat by the low reference signal) by comparing the output of thermistor 204 with the low reference signal. If this comparison indicates that the ambient temperature is below the low temperature limit, a high signal is provided to OR gate 216. Conversely, if this comparison indicates that the ambient temperature is above the low temperature limit, a low signal is provided to OR gate 216.

The output of OR gate 216 is connected to power supply clamp circuit 218. If any of the input signals to the OR gate 216 is high, the output is high, enabling the power clamp circuit 218, in turn disabling the power supply circuit 116 supplying power to the cells 26. If none of the input signals to the OR gate 216 is high, the output is low, disabling the power clamp circuit 218, in turn enabling the power supply circuit 116 to provide power to the cells 26.

Figure 11:
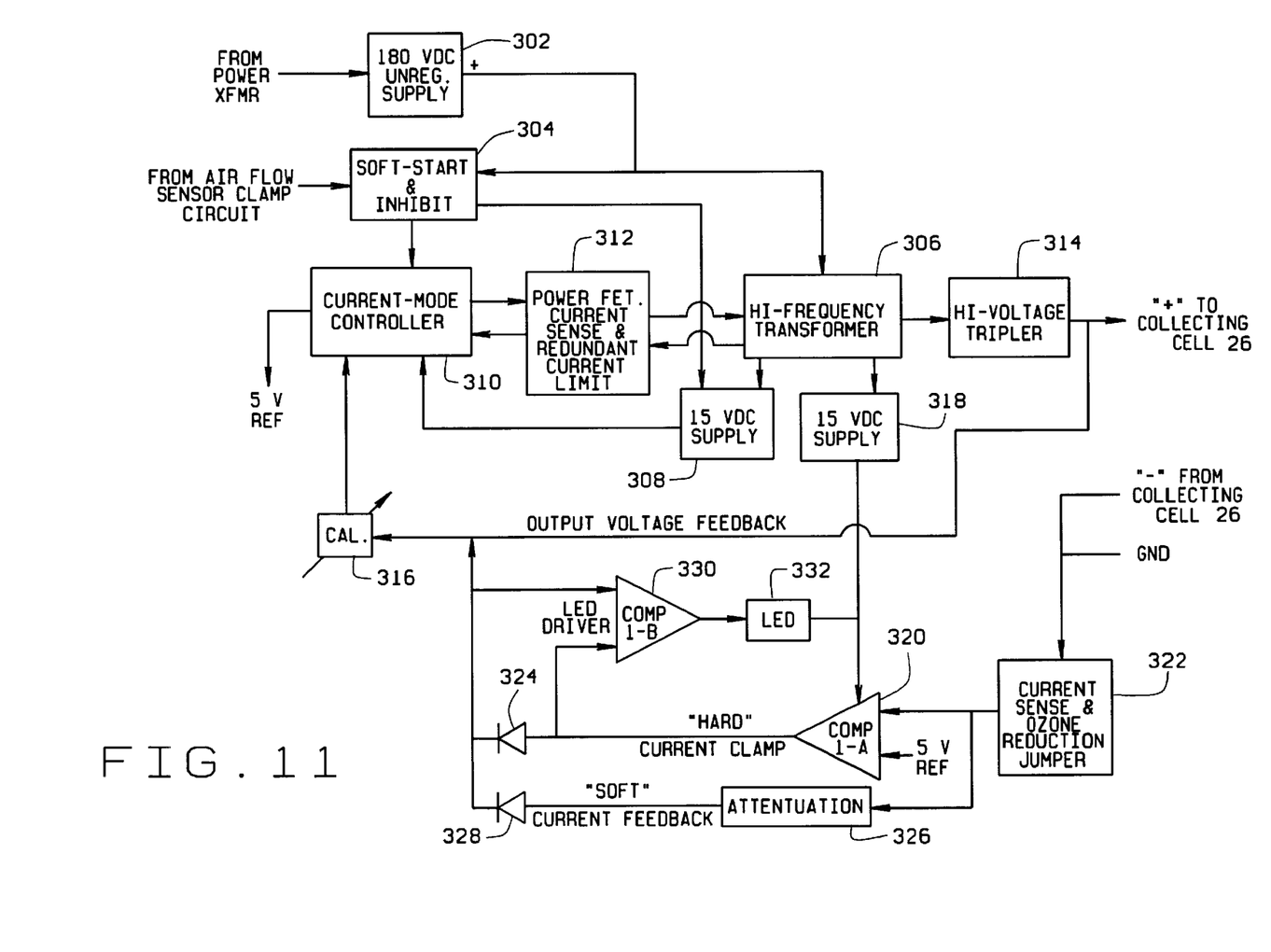
FIG. 11 is a block diagram of the control logic for the power supply circuit.

The operation of high voltage power supply circuit 116 is shown schematically in FIG. 11. Power from transformer 118 is provided to 180 V DC power supply 302. Power from power supply 302 is provided to soft start and inhibit circuit 304 and high frequency transformer 306. The high frequency transformer is connected to 15 V DC supply 308. The soft start and inhibit circuit 304 is connected to supply 308 and to current-mode controller 310. The supply 308 is also connected to current-mode controller 310. The current-mode controller 310 outputs a 5 V reference and is connected to the power FET current sense and redundant current limit circuit 312. The power FET current sense and redundant current limit circuit 312 is connected to the high frequency transformer 306. The high frequency transformer 306 is connected to high voltage triple 314 which provides high voltage to the cells 26. The output is fed back to the current-mode controller 310 via a calibration device 316.

The high frequency transformer 306 is also connected to 15 V DC power supply 318. The power supply 318 powers the comparator 320. A current sense and ozone reduction jumper circuit 322 connected to the cell 26 provides one input to comparator 320. The 5 V reference voltage from the current-mode controller 310 is the other input to comparator 320. The output of comparator 320 is connected through diode 324 to feed back loop. The current sense and ozone reduction circuit 322 is also connected through attenuation circuit 326 and diode 328 to feed back loop. A comparator 330 has one input connected to the output of the comparator 320 and the other input connected to the feed back loop. The output of the comparator 330 is connected through LED 332 to the output of the power supply 318.

Line power is provided via a detachable power cord to receptacle 108. The replaceable fuse 110 and power switch 112 are in series with the primary winding of the power transformer. When the switch 112 is "on", it is illuminated by an internal neon lamp. The transformer supplies 130 V AC to the high voltage power circuit 116 and 22 V AC to the air flow sensor circuit 94. The secondary voltages are isolated from each other. The transformer preferably has a split bobbin construction to reduce conducted EMI.

At start up, the power circuit 116 outputs approximately 6450 V DC to the cells 26 until the flow sensor circuit 94 has sufficient time to warm up and disable the power circuit 116.

During this warm-up period and during normal operation the LED 332 is on. The control logic is such that disconnecting the flow sensor circuit 94 allows the power circuit 116 to operate whenever switch 112 is "on". This allows the electrostatic air cleaner to be controlled remotely by a relay or other device.

Figure 12:
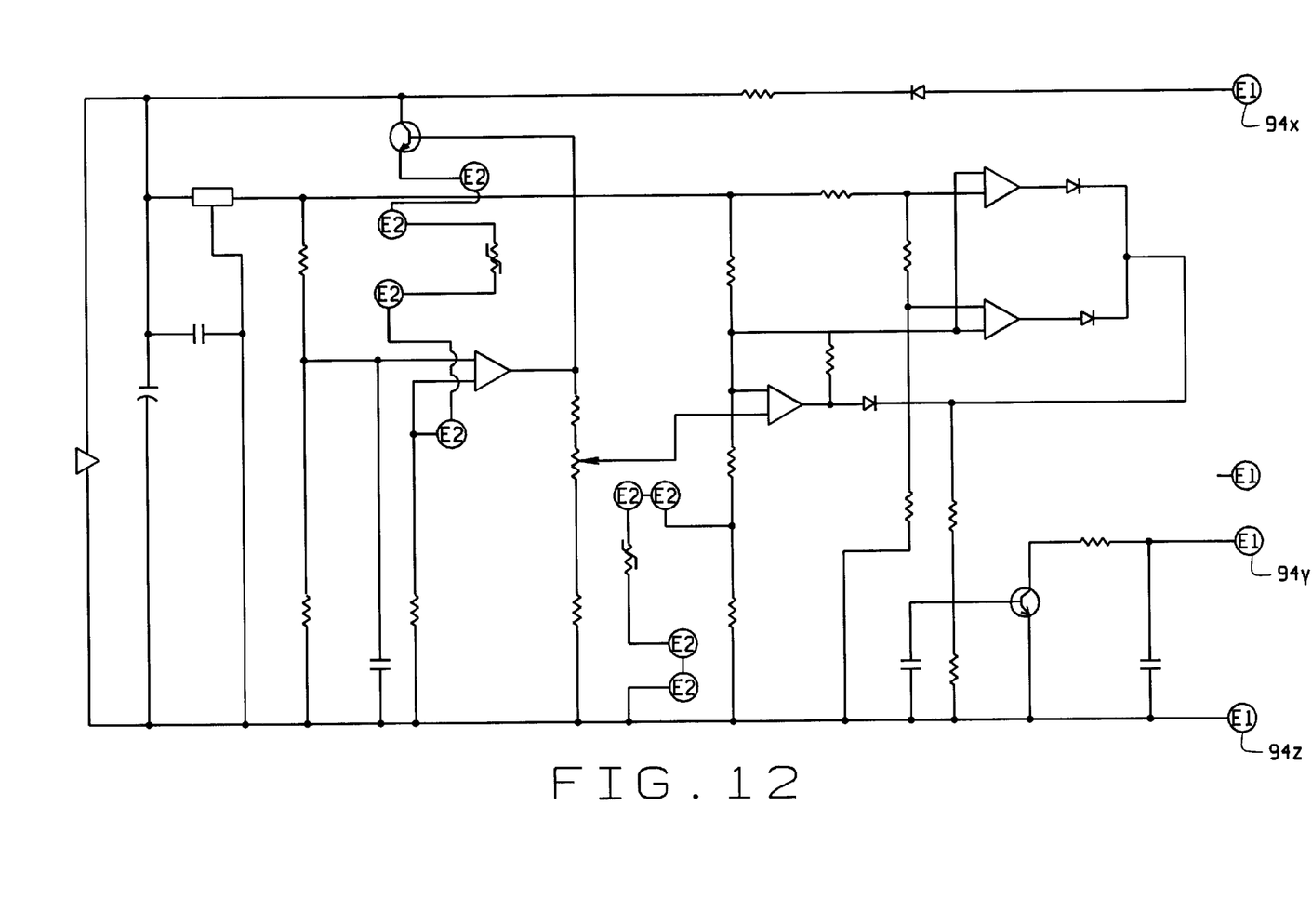
FIG. 12 is a schematic diagram of the air flow sensor circuit.

The flow sensor circuit 94 is shown schematically in FIG. 12. As shown in FIG. 12, filter capacitor C1 is charged to approximately 30 V DC via rectifier diode CR2 and fuse resistor R1. This unregulated voltage powers quad op-amp 1C, power transistor Q1, and 15 volt regulator circuit VR1 and C7.

The voltage divider formed by R3 and R4 supplies a 2 V reference voltage to the non-inverting input of op-amp U1-1. Capacitor C2 filters noise from this reference voltage. Op-amp U1-1 employs the reference voltage to supply a constant 20 milliamps of heating current to the 1K NTC thermistor R18 via emitter-follower Q1 and current sense resistor R5.

When no air is moving past thermistor R18, the thermistor will self-heat and resistance will drop. The output of op-amp U1-1 will drop to maintain a constant current through R18, and when the heat loss and heat gain reach equilibrium, the output of op-amp U1-1 will stabilize. When air is moving past thermistor R18, heat is removed from the thermistor, and resistance will rise. The output of op-amp U1-1 will increase to maintain a constant current through R18, and when heat loss and heat gain reach equilibrium, the output of op-amp U1-1 will stabilize. The output voltage will be dependent on the velocity of the air across R18, which is related to the differential pressure drop across the air cleaner.

A voltage divider network comprising R20, R6, and R7 is connected to the output of op-amp U1-1. Potentiometer R6 is connected to the inverting input of op-amp U1-2. Ambient air temperature is sensed by a 10K NTC thermistor R19. Thermistor R19, together with resistors R8, R9, and R10 provide a temperature/voltage compensation curve to the U1-2 non-inverting input pin. Pot R6 is adjusted to cause the output U1-2 to go low upon application of a specified differential pressure. With no differential pressure drop, the output of op-amp will be high. R17 provides feed back to insure positive switching.

A high output provides base-emitter current via R14 to cause Q2 to conduct and source current from the "SIG" terminal of the power circuit 116 via R15 causing it to deenergize. Conversely, a low output from U1-2 turns off Q2, and allows the power circuit 116 to resume electrostatic air cleaning operation. C6 slows the turn-on of Q2 to prevent excessive surge currents. R16 insures complete turn-off of Q2 and discharge of C6. C5 is used to absorb static discharges.

U1-3, U1-4, R11, R12, R13, CR4, and CR5 form a window comparator circuit which operates to turn on Q2 and disable the electrostatic air cleaner whenever the sensed ambient temperature rises above a predetermined maximum or falls below a predetermined minimum. In this preferred embodiment, the maximum is 100° F., and the minimum is 40° F.

Figure 13:
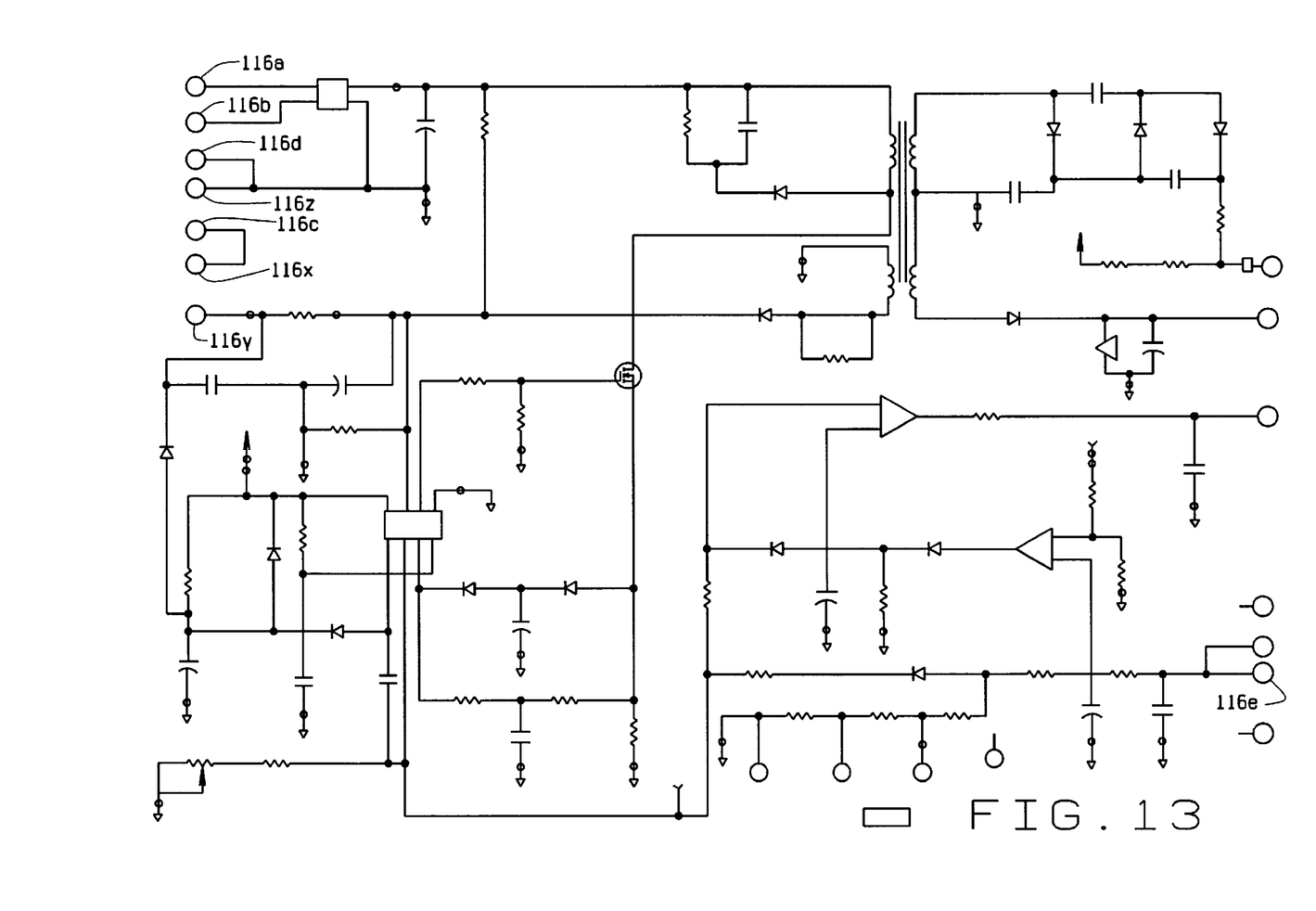
FIG. 13 is a schematic diagram of the power circuit.

The power circuit 116 is shown schematically in FIG. 13. As shown in FIG. 13, the off-board power transformer supplies AC power at approximately 130 V AC to the bridge rectifier RB1. Rectified current is then filtered by capacitor C6. Resistor R11 charges capacitor C1 sufficiently to start the controller chip U1. If start-up is successful, capacitor C1 is maintained in a charged condition via diode CR8 and transformer T1. Resistor R2 insures discharge of C1 during power off. If start up is not successful, the controller chip U1 will drop to a low power state until capacitor C1 charges again.

Current to the primary winding of transformer T1 is sourced from capacitor C6 and returned to SIG GND through MOSFET Q1 and current sensing resistor R10. MOSFET Q1 is turned on and off by the output of pin 6 of controller chip U1, and the current limiting resistor R6. Resistor R7 prevents an over voltage condition on the gate of MOSFET Q1. Pin 3 of controller chip U1 controls the on cycle primary current by measuring the voltage drop across resistor R10 via integrator R9-C4 and current limiting resistor R8. When the voltage level on pin 3 exceeds a certain threshold (determined by the level set by the voltage error amplifier internal to U1) U1 turns MOSFET Q1 off. The MOSFET Q1 is turned on again by controller chip U1 on the next enabling clock cycle. Resistor R3 and capacitor C2 determine the oscillator frequency for the clock in U1.

The pulsating current in the primary of transformer T1 creates an expanding (when MOSFET Q1 is on) and collapsing (when MOSFET Q2 is off) magnetic field in the transformer core. This alternating field induces voltages in the high voltage secondary winding 4–6 and the two low voltage auxiliary windings 3–7 and 2–8. The high voltage winding feeds the voltage tripler network consisting of capacitors C8, C9, and C10, and diodes CR10, CR11, and CR12. The resulting high voltage DC is coupled to the cell terminal via a surge resistor R25.

Regulation of the output is accomplished by the variable "on" time of the MOSFET Q1, which is controlled by the error amplifier in controller chip U1 which monitors the high voltage output via feedback divider network comprising resistors R22, R17, R5, and R4. Resistor R4 comprises a single turn potentiometer for calibrating the output voltage. Compensation capacitor C3 is sized to maximize regulation stability over the operating range of the power supply.

Diode CR7, capacitor C7, and resistor R12 form a snubber circuit which absorbs energy from the primary winding produced by the rapidly collapsing magnetic field during the initial MOSFET Q1 turn-off.

Soft start components diodes CR16 and CR17, resistor R23, and capacitor C17 prevent output overshoot during power up.

Cell current limiting and LED indicator illumination are controlled by dual op-amp U2. The power to operate op-amp U2 is provided by the auxiliary winding 2-8 of transformer T1, rectifier CR9, and filter capacitor C11. During normal operation the LED is turned on by a low on U2-7 which provide a current sink via limiting resistor R1. Capacitor C15 protects U2 from possible static discharge applied to terminal E6 during handling.

Current to the cells 26 is returned to SIGGND via resistors R21, R20, R15 and a removable jumper. Capacitor C14 in conjunction with surge resistor R25, reduce the voltage spike produced by capacitors C9 and C10 when cell arcing occurs. Resistor R21 and capacitor C12 filter out the lower frequency components and stabilize the cell current signal.

As cell current increases to about 1.9 mA, the voltage drop across R15 is sufficient to forward bias diode CR15. Current is added via limiting resistor R19 to the output voltage sense feedback circuit resulting in a positive error voltage to U1-2. U1 reacts by reducing the high voltage output proportional to this error. The purpose of this negative regulation region is to prevent excessive ozone generation in a new or recently cleaned cell by limiting the power until it has aged sufficiently to operate at its intended (lower) current level, whereby the voltage would return to normal thus maintaining cleaning efficiency.

If the cell current increases to 2.6 mA, the combined voltage drop across R15 and R20 is sufficient to exceed the 5 volt reference on U2-2 (R18 decouples noise induced on the circuit board trace). U2-1 switches from low to high, which forward biases CR14 and charges capacitor C13. The diode CR13 becomes forward biased, which reverses the differential polarity on input pins 5 and 6 of U2, causing the output to go high, thus, turning off the LED 332. Current through CR13 is routed via limiting resistor R13 to the voltage feedback circuit. This current is substantially greater than the aforementioned current through R19 and "swamps" the voltage sense input of U1. The high positive error voltage causes U1 to essentially shut down. The resulting loss of output voltage to the cell reduces the current sensed by U2-3. U2 output returns to a low state, CR14 is reverse biased, and capacitor C13 discharges through R14. As C13 discharges, the error voltage to U1 decreases and the output voltage starts to increase. If the current returns to normal, capacitor C13 will continue to discharge, CR13 will become reverse biased and the LED 332 will turn on. If a high cell current condition continues to exist, U2-1 will again go high before capacitor C13 discharges and the shutdown process repeats.

4-pin header E11 with a movable shunt connector provides a three-position field-selectable ozone reduction feature. When the shunt is moved, it adds R16 and/or R29 into the normal cell current path (R15). This increases the voltage drop of the network, causing the current limiting function to activate at a lower cell current. This allows field-adjustment to reduce the amount of ozone generated by the electrostatic cell during normal operation.

If the current limiting circuit were to fail, a redundant limiting circuit would be activated. The high cell current (approximately 4 to 4.5 mA.) would cause the voltage drop across the T1 primary circuit current sense resistor R10 to become sufficient to forward bias diodes CR5 and CR6. This would result in a positive error voltage on current sense pin U1-3 which also causes U1 to essentially shut down, thereby, limiting the output current to less than 5 mA. A smoothing capacitor C5 prevents premature forward biasing of CR6 during normal current peaks in the T1 primary circuit which could result in erratic LED operation.

The remote air flow sensor disables the operation of the power supply circuitry by applying a "low" to the "SIG" (E14-3) terminal. This low discharges capacitor C17, which puts the controller in the slow-start mode. With the output now greatly reduced, source filter capacitor C1 is discharged via R30 below the operating threshold of U1 which stops the Q1 gate drive. When air flow is sensed, the "SIG" terminal is allowed to go high and a normal startup occurs.

Figure 14:
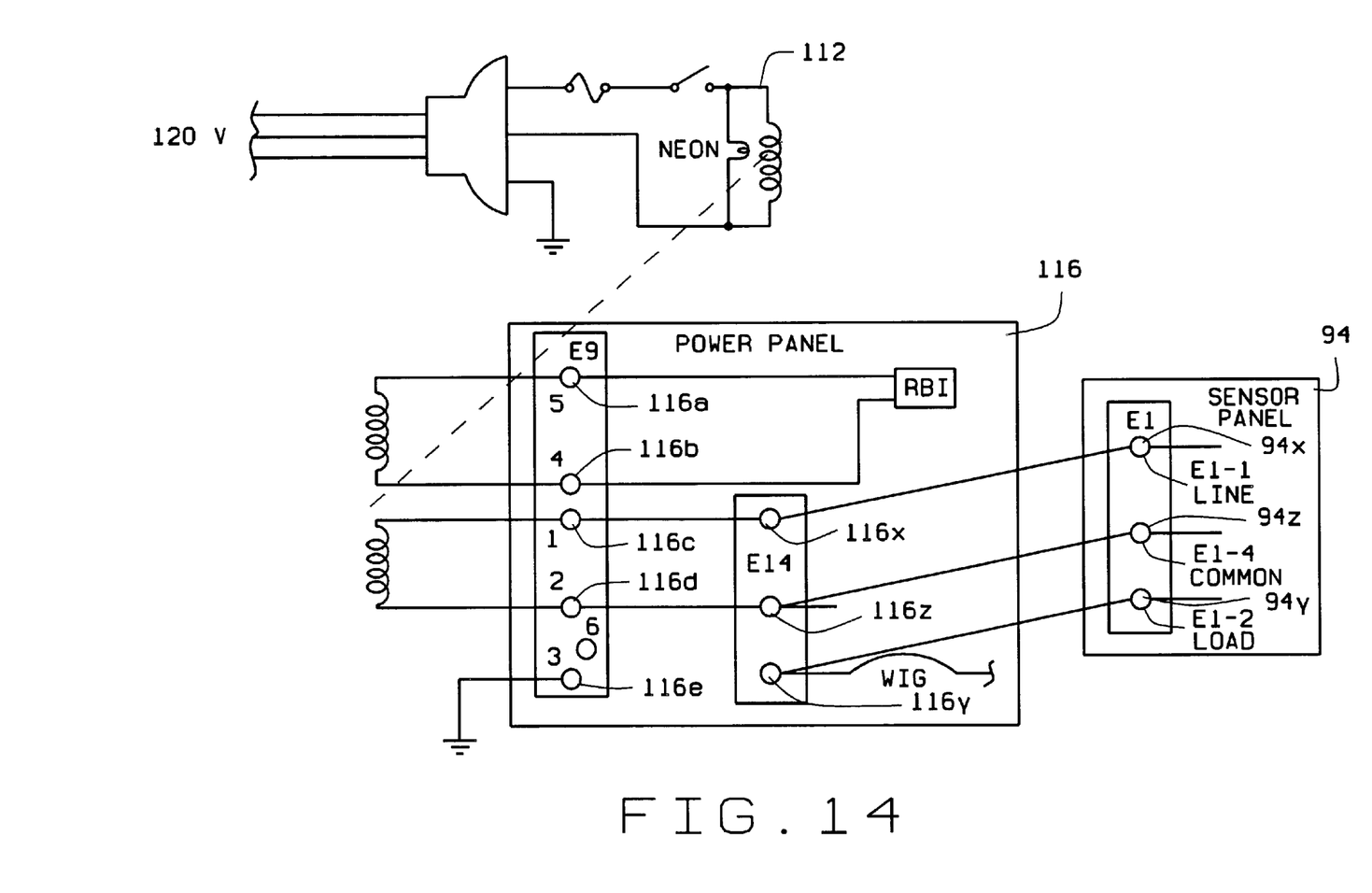
FIG. 14 is a schematic diagram of the connection between the flow sensor circuit and the power supply circuit.

FIG. 14 shows the connection between the air flow sensor circuit 94 and the power circuit 116. Nodes 94x, 94y, and 94z in FIG. 12 correspond to the nodes 94x, 94y, and 94z in FIG. 14. Similarly, notice 116x, 116y, and 116z in FIG. 13 correspond to the nodes 116x, 116y, and 116z in FIG. 14. Finally, the nodes 116a, 116b, 116c, 116d, and 116e in FIG. 13 correspond to the nodes 116a, 116b, 116c, 116d, and 116e in FIG. 14.

What is claimed is:

1. An electrostatic air cleaner for an air circulating system comprising at least one electrostatic cell, a power supply for providing power to the electrostatic cell, a first baffle and a second baffle, the first baffle engaging the electrostatic cell on the upstream side of the air circulating system and the second baffle engaging the electrostatic cell on the downstream side of the air circulating system, and a control for cutting off power from the power supply to the electrostatic cell when air flow through the air circulating system is below a predetermined minimum, the control comprising a bypass tube extending between the first and second baffles, and an air flow sensing circuit for sensing the air flow through the bypass tube and controlling the power supply to cut off power from the power supply to the electrostatic cell when the sensed air flow is below a predetermined minimum.

2. The electrostatic air cleaner for an air circulating system according to claim 1 wherein the air flow sensing circuit comprises a self-heating thermistor in the bypass tube.

3. The electrostatic air cleaner for an air circulating system according to claim 2 wherein the air flow sensing circuit comprises a comparator for comparing the output of the self-heating thermistor with a reference.

4. The electrostatic air cleaner according to claim 1 further comprising means for sensing the ambient temperature and cutting off the power supply to the electrostatic cell when ambient temperature is below a predetermined minimum.

5. The electrostatic air cleaner according to claim 1 further comprising means for sensing the ambient temperature and cutting off the power supply to the electrostatic cell when ambient temperature is above a predetermined maximum.

6. The electrostatic air cleaner according to claim 1 wherein the air flow sensing circuit includes a second thermistor for sensing the ambient temperature.

7. An electrostatic air cleaner for an air circulating system comprising at least one electrostatic cell, a power supply for providing power to the electrostatic cell; and a control for cutting off power to the electrostatic cell when air flow through the air circulating system is below a predetermined minimum, the control comprising a first baffle engaging the electrostatic cell on the upstream side of the air circulating system, a second baffle engaging the electrostatic cell on the downstream side of the air circulating system, the first and second baffles having aligned openings therein, and a bypass tube extending between the aligned openings in the first and second baffles, across the electrostatic cell, and an air flow sensing circuit for sensing the air flow through the bypass tube and controlling the power supply to cut off power to the electrostatic cell when the sensed air flow is below a predetermined minimum.

8. The electrostatic air cleaner according to claim 7 wherein the air flow sensing circuit comprises a self-heating thermistor in the bypass tube.

9. The electrostatic air cleaner according to claim 8 wherein the air flow sensing circuit comprises a comparator for comparing the output of the self-heating thermistor with a reference.

10. The electrostatic air cleaner according to claim 7 further comprising means for sensing ambient temperature and cutting off power supply to the electrostatic cell when the ambient temperature is below a predetermined minimum.

11. The electrostatic air cleaner according to claim 7 further comprising means for sensing ambient temperature and cutting off power supply to the electrostatic cell when the ambient temperature is above a predetermined minimum.

12. The electrostatic air cleaner according to claim 7 wherein the air flow sensing circuit includes a second thermistor for sensing ambient temperature.

* * * * *